Jan. 16, 1945. T. H. LOY 2,367,466
GARDEN TRACTOR
Filed May 15, 1942
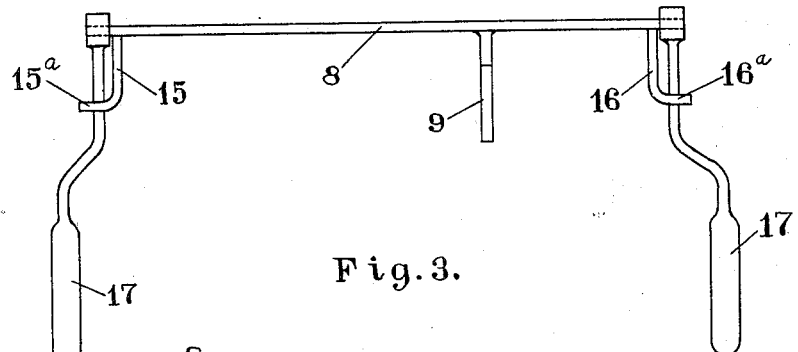
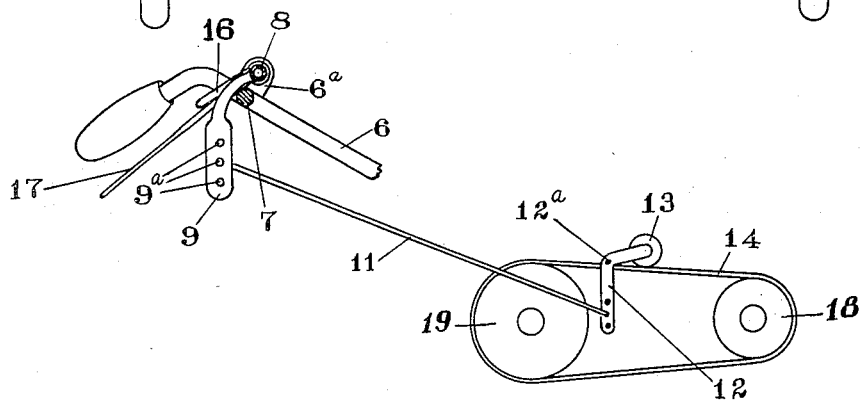
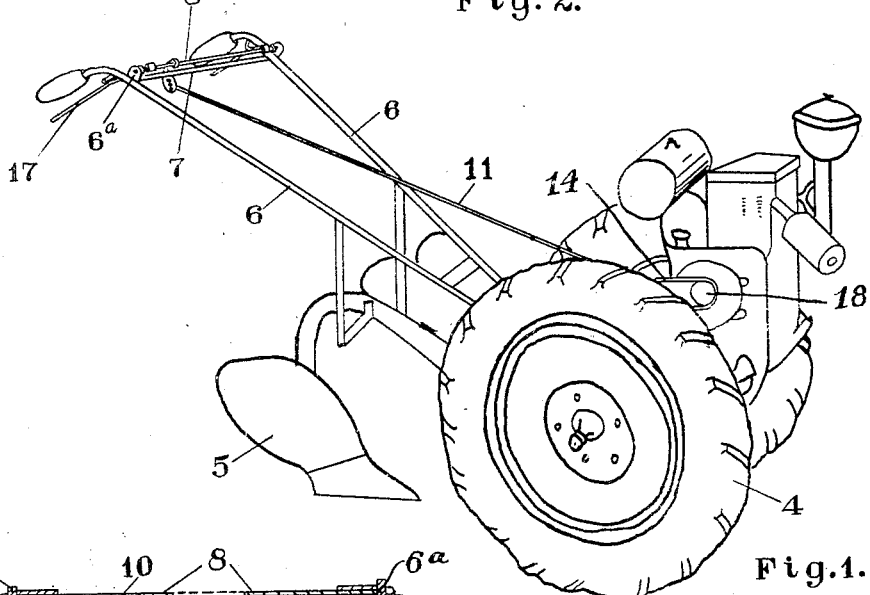
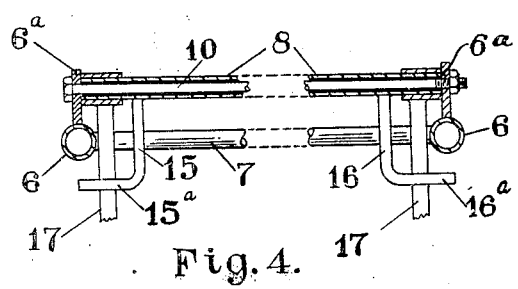
Inventor
THOMAS H. LOY
By *Finckel & Finckel*
Attorney Patented Jan. 16, 1945

2,367,466

UNITED STATES PATENT OFFICE 2,367,466

GARDEN TRACTOR

Thomas H. Loy, Columbus, Ohio

Application May 15, 1942, Serial No. 443,096

2 Claims. (Cl. 180—19)

This invention relates more particularly to power driven tractors for carrying and drawing the appropriate tool or tools for doing the particular sort of work required in the cultivation of the soil as in preparing it for seeding or planting and harvesting a garden or other crop. Some tractors such as are now on market and as herein shown include a suitable frame supported by a pair of large tractor wheels, a liquid fuel engine and fuel, controllable means including a transmission mechanism for driving the axle and its wheels of the tractor, and a pair of handle arms, one for the right hand and one for the left hand, for guiding the tractor in the direction desired.

In such garden tractors as now sold the means for controlling the tractor drive means is remote from the guiding handle or handles.

It is therefore an object of my invention to provide means whereby either hand of the operator can be used on either side or both hands used for guiding the tractor and at the same time control and regulate the application of power to drive and control the direction of movement of the traction wheels. Other objects can be gathered from the drawing and description herein.

The invention is embodied in the preferred example herein described and shown in the accompanying drawing in which latter—

Figure 1 is a perspective view showing a tractor of common construction with my invention applied thereto.

Fig. 2 is a detail inside and sectional view on a larger scale showing the left hand guiding handle and the relation of a power control to the guiding handles.

Fig. 3 is an elevational view on a larger scale showing the power control means diagrammatically ready for application to the handle bars of the tractor.

Fig. 4 is a detail sectional view on a larger scale and broken out showing how the bar of the actuating means is mounted on the guiding arms.

In the views the character 4 designates the traction wheels which support the driving engine and a suitable frame for supporting them with which the tool is connected, as for example, a plow as indicated at 5.

The characters 6 designate the usual guiding or steering arms provided at their rear ends with handles or grips as shown for the right and left hand respectively in normal work of the operator. The said guiding or steering arms have fixed therebetween usual connecting and bracing rod 7 to hold them in a fixed position apart.

Rockably mounted on a bar 10 secured in bearings 6ª on the guiding arms 6 and 6 is a tubular shaft 8 to which is fixedly secured an eccentric member 9 provided with several perforations 9ª in the appropriate one of which is removably secured the rear end of the tractor control rod 11 while the forward end extends to and is connected with one end of a bell-crank lever 12 having a fulcrum at 12ª on the tractor frame as usual. The said lever 12 carries at its other end a roller 13 that presses in driving operation against a belt 14 that entends around the drive wheel 18 and a power transmitting wheel 19 for applying and transmitting the power accordingly as required from the engine shaft to the axle of the tractor wheels. By simply rocking said shaft 8 and the eccentric 9 the application of the power of the engine effects the quick starting or the stopping of the travel of the tractor.

The means for rocking the shaft 8 and eccentric 9 fixed thereon includes two fingers 15 and 16 suitably connected with the ends of said rock shaft 8 said fingers 15 and 16 each having a lateral extension 15ª and 16ª, said extensions adapted to be engaged by either one of the hand levers 17 connected with the handle so as to be within reach of the fingers of the hand of the operator while at the same time holding the handle of either of the guiding arms 6. Therefore because the tractor can be steered with one hand it can with my invention be steered by either the right or the left hand alone holding either of the steering arms, the speed and control of the tractor being regulated by the fingers of the hand on either of the levers 17.

It will be observed that the shaft 8 is positioned above and parallel to the regular bracing rod 7 so that said rod 7 supports the levers 17 in a position that is at all times within reach of the fingers of the hand or hands holding the steering handles.

It will be observed also that when, for example, the soil is to be plowed the operator can comfortably walk on the level unplowed ground paralleling the furrow and control the operation of the engine with his right hand alone applied to the left hand guiding arm or, conversely if circumstances require, with the left hand holding the right hand guiding arm. Moreover if any other work is to be done by one hand while the other hand is steering the tractor, as, for example, guiding a laterally shiftable cultivator, that work can be done with the free hand whether it be right or the left.

My invention can be used in connection with power operated lawn mowers.

The forms of the parts can be changed within the skill of the mechanic without departing from the gist of the invention as claimed. For example the lateral projections 16 can be omitted and the handles 17 fixed to the ends of the shaft 8. When the lateral projections 16 are omitted and the handle 17 fixed to the shaft 8 the torque on said shaft is greater than when lateral projections 16 are employed.

What I claim is:

1. The combination with an engine-driven wheel-supported tractor for carrying a tool for tilling the soil having handled arms for steering the tractor, a bar connecting said handled arms and means on said tractor for applying the power of the engine to the tractor wheels, of means for manually controlling the application of the power of the engine to the supporting wheels of the tractor including a rock shaft having eccentric means affixed thereto supported on said handled arms, a rod operably connecting said eccentric means with the means on the tractor for applying the driving power of the engine to the tractor wheels, and a manually operable lever connected with each of the ends of the said rock shaft and having their movements in one direction limited by the said bar connecting the steering arms.

2. The combination with an engine-driven wheel-supported tractor for carrying a tool for tilling the soil having a two-handled means for steering the tractor and means on said tractor for applying the power of the engine to the tractor wheels, of means mounted on said handled means for controlling the application of power of the engine to the supporting wheels of the tractor by either the right or the left hand of the operator including a rock shaft having eccentric means affixed thereto supported on said handled means, a rod operably connecting said eccentric means with the means on the tractor for applying the driving power of the engine to the tractor wheels, and a manually operable lever connected with each of the ends of the said rock shaft having their movement in the down direction limited by the said handled means for steering the tractor.

THOMAS H. LOY.